(12) United States Patent  
Kalayeh

(10) Patent No.: US 7,411,196 B2
(45) Date of Patent: Aug. 12, 2008

(54) MULTI-SENSORS AND DIFFERENTIAL ABSORPTION LIDAR DATA FUSION

(75) Inventor: Hooshmand M. Kalayeh, Pittsford, NY (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 308 days.

(21) Appl. No.: 11/206,540

(22) Filed: Aug. 18, 2005

(65) Prior Publication Data

US 2007/0040121 A1 Feb. 22, 2007

(51) Int. Cl.
*G01J 5/02* (2006.01)
(52) U.S. Cl. ....................................... 250/342
(58) Field of Classification Search ................. 250/342, 250/339.01, 253
See application file for complete search history.

(56) References Cited

U.S. PATENT DOCUMENTS

| | | |
|---|---|---|
| 3,032,655 A | 5/1962 | Gleason |
| 4,001,764 A | 1/1977 | Holland et al. |
| 4,450,356 A | 5/1984 | Murray et al. |
| 4,489,239 A | 12/1984 | Grant et al. |
| 4,555,627 A | 11/1985 | McRae, Jr. |
| 4,853,543 A | 8/1989 | Ozdemir |
| 4,870,275 A | 9/1989 | Ozdemir et al. |
| 4,871,916 A | 10/1989 | Scott |
| 4,963,742 A | 10/1990 | Abernathy |
| 5,157,257 A * | 10/1992 | Geiger ..................... 250/338.5 |
| 5,166,789 A | 11/1992 | Myrick |
| 5,250,810 A | 10/1993 | Geiger |
| 5,294,796 A | 3/1994 | Fee |
| 5,298,751 A | 3/1994 | Fee et al. |

(Continued)

FOREIGN PATENT DOCUMENTS

EP 0 489 546 A 6/1992

(Continued)

OTHER PUBLICATIONS

Werner Zirnig et al., "Innovative Technologies Improve Environmental Protection—Detection of Gas Leaks by Helicopter-Borne Infrared Laser System" pp. 1-7.

(Continued)

*Primary Examiner*—David P. Porta
*Assistant Examiner*—Djura Malevic
(74) *Attorney, Agent, or Firm*—RatnerPrestia

(57) ABSTRACT

A method of acquiring data uses multiple sensors in an aircraft. The method includes the steps of: (a) turning ON a DIAL sensor to detect a target of interest during a first flight pass over a region of interest (ROI), wherein the target of interest is a gas or oil pipeline leak; (b) detecting the target of interest using the DIAL sensor; and (c) storing location of the detected target in a look up table (LUT). The method also includes the steps of: (d) during a second flight pass over the ROI, triggering another sensor to turn ON at or about the location stored in the LUT; and (e) confirming presence of the target of interest using both ON-sensors. If necessary, a third flight pass over the ROI is conducted and yet another sensor is triggered to turn ON at or about the location stored in the LUT. Presence of the target of interest is confirmed using all three ON-sensors.

18 Claims, 6 Drawing Sheets

U.S. PATENT DOCUMENTS

| | | | |
|---|---|---|---|
| 5,410,154 | A | 4/1995 | Broicher et al. |
| 5,430,293 | A | 7/1995 | Sato et al. |
| 5,481,476 | A | 1/1996 | Windig |
| 5,742,053 | A | 4/1998 | Rekunyk |
| 5,818,951 | A | 10/1998 | Schivley |
| 5,878,356 | A * | 3/1999 | Garrot et al. .................... 701/1 |
| 5,883,584 | A | 3/1999 | Langemann et al. |
| 6,366,681 | B1 | 4/2002 | Hutchins |
| 6,484,564 | B1 | 11/2002 | Hayashida |
| 6,509,566 | B1 | 1/2003 | Wamsley et al. |
| 6,725,705 | B1 | 4/2004 | Huebler et al. |
| 6,822,742 | B1 | 11/2004 | Kalayeh et al. |
| 2002/0060784 | A1 * | 5/2002 | Pack et al. .................... 356/6 |
| 2003/0030001 | A1 | 2/2003 | Cooper |
| 2004/0167709 | A1 * | 8/2004 | Smitherman et al. ........ 701/208 |
| 2004/0232338 | A1 * | 11/2004 | Tolton et al. ............. 250/338.5 |
| 2005/0134859 | A1 * | 6/2005 | Kalayeh et al. ............. 356/437 |

FOREIGN PATENT DOCUMENTS

WO      WO 86/01295    *   2/1986

OTHER PUBLICATIONS

Egor V. Degtiarev et al., "Compact mid-infrared DIAL lidar for ground-based and airborne pipeline monitoring", SPIE, vol. 4882, 2003, pp. 432-441.

S. Brunsgaard et al., "High-Pressure Measuring Cell for Raman Spectroscopic Studies of Natural Gas", Applied Spectroscopy, vol. 55, No. 1, 2001, pp. 55-60.

International Search Report of Application No. PCT/US2004/042485 dated Apr. 29, 2005.

H. Edner et al., "Novel Remote Gas Monitoring and Imaging in the IR Spectral Region", IEEE, vol. 2, 1999, pp. 577-578.

Allen Geiger et al., "ELM: A Phase III SBIR", IEEE, 1998, pp. 61-70.

International Search Report Application No. PCT/US2006/027882 dated Dec. 29, 2006.

\* cited by examiner

MULTI-SENSORS AND DIFFERENTIAL ABSORPTION LIDAR DATA FUSION

TECHNICAL FIELD

The present invention relates, in general, to the field of remote target detection and recognition. More specifically, the invention relates to detection and recognition of a remote target, by efficiently and robustly fusing real-time data from multi-sensors and real-time data from a differential absorption LIDAR (DIAL) system.

BACKGROUND OF THE INVENTION

In the current state of the art of remote sensors, data are separately acquired from each of the remote sensors and separately stored in a storage device. The data may then be processed and analyzed to improve recognition of the remote target.

Recognition of a target without prior knowledge, however, is similar to searching and recognizing a needle in a haystack. Recognition of a target based on data collected from multiple sensors is very costly and inefficient. Furthermore, robustness of target recognition based on current fusion of multi-sensor data is questionable.

A typical target of interest covers an area that is likely smaller than 5% of the total area searched by a sensor. As such, much of the data collected and stored in a storage device is useless and, typically, is discarded after the data is retrieved from the storage device, processed and analyzed.

As will be described, the present invention provides an efficient, real-time and robust recognition of a target, based on real-time multi-sensor image acquisition and fusion of the acquired data that only pertains to the target region of interest.

SUMMARY OF THE INVENTION

To meet this and other needs, and in view of its purposes, the present invention provides a method of acquiring data using multiple sensors integrated in one or more vehicles. The method includes the steps of: (a) turning ON a DIAL sensor to detect one or more targets of interest, during a first pass over a preplanned path, wherein the targets include gas or oil pipeline leaks located at regions of interest (ROI); (b) storing locations of the detected targets of the ROI in a computer Look Up Table (LUT); (c) during a second pass over the ROI, triggering another sensor to turn ON at or about the location stored in the LUT; and (d) confirming presence of the detected targets using both the other sensor and the DIAL sensor. The method also includes the steps of: (e) quantifying the detected targets using data acquired during the first and second pass; (f) mapping quantities and associated locations of the detected targets of the ROI; (g) storing the quantities and associated locations of the detected targets of the ROI in a computer as a map image; and (h) displaying the map image.

The DIAL sensor may be a multi-line DIAL sensor having at least two ON-line laser light sources and one OFF-line laser light source for simultaneous illumination of the target. The other sensor may be a multi-spectral camera which is turned ON by a trigger from the multi-line DIAL sensor.

After turning ON the DIAL sensor, the method acquires data using the DIAL sensor during the first and second pass over the ROI, and after triggering the other sensor to turn ON, the method acquires data using the other sensor only during the second pass and only at or about the location stored in the LUT.

Another embodiment of the present invention includes a method of acquiring data using multiple sensors in an aircraft. The method has the steps of: (a) turning ON a multi-spectral camera to detect a target of interest during a first flight pass over a region of interest (ROI), wherein the target of interest is a gas or oil pipeline leak; (b) detecting the target of interest using the multi-spectral camera; (c) storing location of the detected target in a look up table (LUT); (d) during a second flight pass over the ROI, triggering another sensor to turn ON at or about the location stored in the LUT; and (e) confirming presence of the target of interest using both the other sensor and the multi-spectral camera.

Yet another embodiment of the present invention includes a method of acquiring data using multiple sensors in an aircraft. The method has the steps of: (a) turning ON a first sensor to detect a target of interest during a first flight pass over a region of interest (ROI); (b) detecting the target of interest using the first sensor; (c) storing location of the detected target in a look up table (LUT); (d) during a second flight pass over the ROI, triggering a second sensor to turn ON at or about the location stored in the LUT; and (e) confirming presence of the target of interest using both the first and second sensors.

It is understood that the foregoing general description and the following detailed description are exemplary, but are not restrictive, of the invention.

BRIEF DESCRIPTION OF THE DRAWING

The invention is best understood from the following detailed description when read in connection with the accompanying drawing. Included in the drawing are the following figures.

DETAILED DESCRIPTION OF THE INVENTION

The present invention provides a method for reducing the amount of data required to be stored, processed and analyzed when attempting to remotely detect and recognize a target. The present invention provides an efficient, real-time and robust recognition of a target based on real-time multi-sensor target acquisition and fusion of data.

In one exemplary embodiment, the present invention begins operation of a multi-sensor system, based on an automatic look-up table (LUT). The LUT may be programmed based on prior information of a target and prior information on environmental conditions. Based on information stored in the LUT, one or more sensors may be automatically turned ON. Next, based on real-time processing of the sensors that are turned ON, a region of interest may be identified.

After the region of interest is identified, another set of one or more sensors may be automatically triggered to turn ON and begin processing data regarding the region of interest. After passing over the region of interest, these sensors may be turned OFF again. In this exemplary embodiment, one or more sensors that are normally in an OFF state may be selectively turned ON at appropriate times for simultaneous intelligent image acquisition and robust target recognition.

Figure 1:
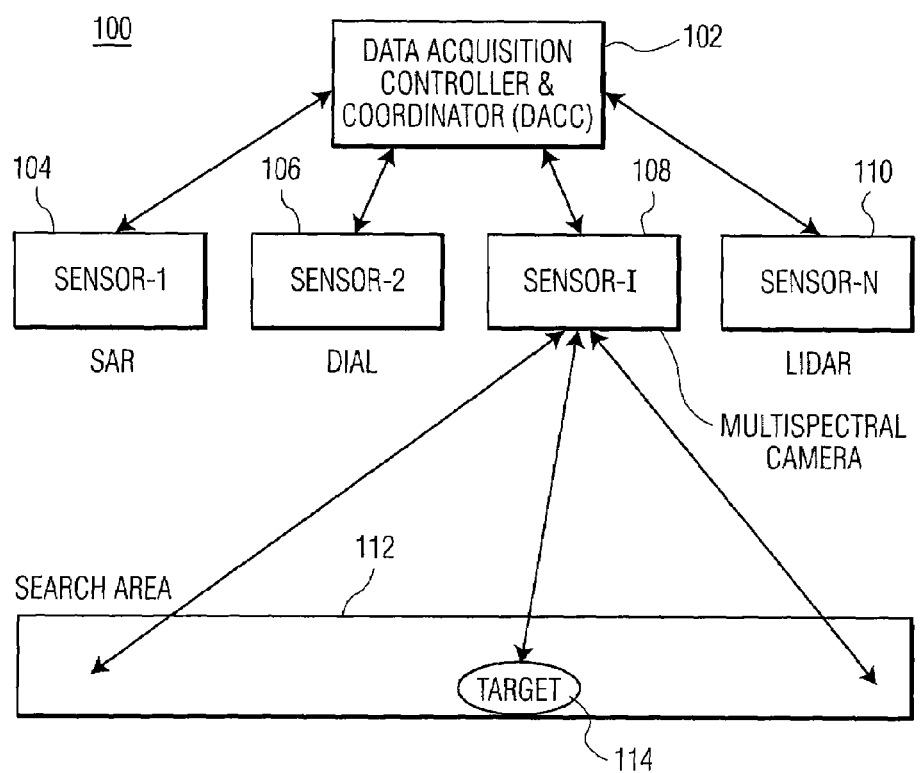
FIG. 1 is a multi-sensor target acquisition and detection system, in accordance with an embodiment of the present invention.

Referring to FIG. 1, there is shown a multi-sensor target acquisition and detection system, generally designated as 100. As shown, multiple sensors are included in the system, for example, sensor 1, sensor 2, sensor I, etc., and sensor N. As a further example, sensor 104 may be a synthetic aperture radar (SAR), sensor 106 may be a multi-line dial (differential absorption LIDAR) sensor, sensor 108 may be a multi-spectral camera, and sensor 110 may be a LIDAR (light detection and ranging) sensor. Each sensor may be turned ON or turned OFF by a centralized data acquisition controller and coordinator (DACC), generally designated as 102. As also shown, system 100 is tasked to search area 112 and identify one or more regions of interest (ROI). One ROI is shown in FIG. 1, and is designated as target 114. A ROI may include more than one target.

As will be described, system 100 may be disposed in an aircraft and tasked to identify multiple regions of interest. For example, during a first flight pass over a search area, only one sensor may be turned ON, such as DIAL sensor 106. When DIAL sensor 106 identifies a region of interest, the geographic location of that region of interest may be stored in a memory or storage device (not shown in FIG. 1). In order to better identify the region of interest found during the first flight pass, DACC 102 may command sensor 108 to be turned ON in anticipation of a second flight pass over the same search area, or more specifically in anticipation of a second flight pass over the same region of interest.

Accordingly, multi-spectral camera 108 is turned ON to observe and more soundly identify target 114 during the second flight pass. Because multi-spectral camera 108 is turned ON only after being commanded by DACC 102 upon approaching the region of interest, the amount of data that is acquired, processed, analyzed and fused together is minimized. The multiple data includes information pertaining only to characteristics of the region of interest.

It will be appreciated that DIAL sensor 106 may be a two line DIAL remote laser sensor, a three line DIAL remote laser sensor, or a multi-line DIAL remote laser sensor. The DIAL sensor samples the atmosphere along a flight path and may detect most trace gases in the atmosphere. The DIAL sensor is effective in monitoring minute concentrations of natural gas or oil leaks from an underground pipeline.

As an example, the DIAL sensor (also referred to as a system) may include a three-line tunable differential absorption LIDAR for detecting methane and ethane. Methane and ethane may be detected by tuning the DIAL system to include two ON-line wavelengths. The ON-line wavelengths are selected close to the peak of the target gas optical absorption line that has minimum interference from other gases in the atmosphere. The OFF-line wavelength is selected near the wing of the target gas optical absorption line with minimum interference from other gases and high ground surface reflectivity. A criteria for the ON-line wavelength selection is that the absorption wavelength is expected to be only dominated by methane and ethane, and a criteria for the OFF-line wavelength selection is that the absorption wavelength is expected not to be dominated by methane, ethane or by other atmospheric particles.

The DIAL system may also be an N-line tunable laser optical system. In an N-line tunable laser DIAL system, multiple laser sources may be tuned to different ON-line wavelengths and multiple laser sources may be tuned to OFF-line wavelengths. Selection of the wavelengths may depend on the region of interest tasked to be detected and identified by system 100.

Another example of a sensor that may be used for data fusion with other sensors on the aircraft is a multi-spectral camera. Multi-spectral camera 108 may include, for example, two visible channels and one short wave IR channel for image acquisition. As another example, sensor 108 may include a simple monochromatic or color camera, or may be a specially configured camera for a specific application.

A multi-spectral camera or a monochromatic camera operating in real-time image acquisition requires huge amounts of image storage capacity. Therefore, the present invention provides an intelligent and selective image acquisition of only regions of interest and fusion of the acquired images with, for example, a multi-line laser system. The present invention, for example, when used to detect pipeline oil and gas leaks, may turn ON, or activate DIAL system 106 for the duration of the entire mission, but only activate multi-spectral camera 108 after a region of interest has been identified by DIAL system 106. In this manner, data acquisition, data processing, data analysis and data fusion are advantageously minimized.

As another example, system 100 may be utilized to detect an oil or gas pipeline leak by first operating DIAL system 106 during a first flight pass over search area 112. When a region of interest is detected, for example, near or about target 114, multi-spectral camera 108 may be turned ON, in order to confirm the detection of the DIAL system and, thereby, increase the probability of having detected an oil or gas pipeline leak. During a second flight pass over the target, sensor 104, such as synthetic aperture radar (SAR) may be turned ON to acquire topographical data of the region of interest. If it is known, however, that the region of interest is in an area having a flat topography, the SAR sensor may not be turned ON. Under such circumstance, the present invention may be configured to only activate sensor 110, which may be a LIDAR system, in order to identify the topography surrounding target 114. By turning sensors ON and OFF, as necessary, based on data stored in a LUT, which specifies the operational environment expected to be found at the region of interest, the present invention effectively keeps data acquisition, data processing, data storage and data analysis at a minimum.

Figure 2:
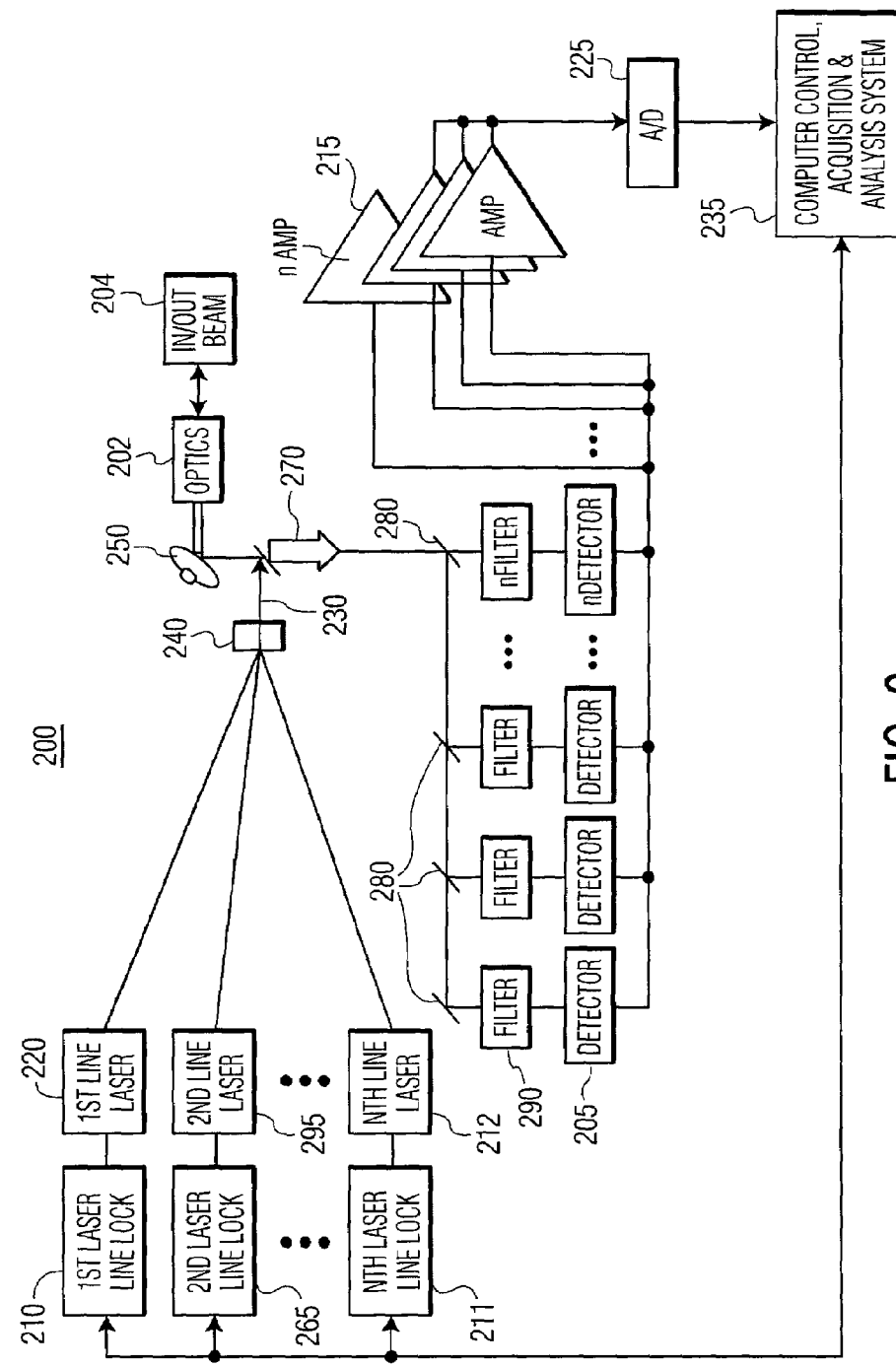
FIG. 2 is a multi-line DIAL laser system, used in accordance with an embodiment of the present invention.

An exemplary multi-line DIAL laser system (or sensor) is shown in FIG. 2, generally designated as 200. As shown, a multi-line tunable DIAL laser system, generally designated as 200, includes N lasers of which M are ON-line lasers and L are OFF-line lasers (N=M+L).

For example, first line laser 220 may be an ON-line laser used for a first target trace gas, second line laser 295 may be a second ON-line laser used for a second target trace gas, etc. In one embodiment, the $N^{th}$ line laser 212 may be an OFF-line laser used for identifying a target-background. Other combinations of ON-line lasers and OFF-line lasers may be used in the N line lasers shown in FIG. 2. The N line lasers may be, respectively, locked on to N different wavelengths by line lock amplifiers 210, 265, etc., and 211.

More than one OFF-line lasers may be used for removing different variability of system parameters. For example, surface covered type (background) reflectance variability may be removed to obtain a more simple and reliable multi-line DIAL equation.

It is within the scope of the present invention that, in addition to lasers, other types of optical sources may be used.

Furthermore, the ON-line wavelengths may be selected to be close to the peak of a target gas optical absorption characteristics and the OFF-line wavelengths may be selected to be near a wing of a target gas optical absorption wavelength.

The multiple ON-line and OFF-line laser beams are, respectively, combined by combiner 240 to form combined laser beam 230. The combined laser beam is reflected by mirror 250 into optics 202 to form output laser beam 204.

For the region of interest, trace gases in the atmosphere, near the ground, may be sequentially scanned by optics 202. Output laser beam 204 is scattered, transmitted through, and/or reflected back to form return light 270. Return light 270 passes through a set of beam splitters 280 prior to encountering a set of filters 290. These set of filters are tuned, respectively, to pass each of the multiple ON-line and OFF-line wavelengths. A plurality of detectors 205 convert each of the filtered lights into a respective electronic signal. The electronic signals are amplified by amplifiers 215 and then converted into digital signals by a set of analog-to-digital (A/D) converters 225. The digitized signals are processed and analyzed by computer 235 to identify and quantitatively measure one or more targets of interest. These targets are detected based on the operator selected spectral absorption characteristics and based on the operator selected spectral non-absorption characteristics of the target-backgrounds.

The multi-line DIAL tunable laser system 200 may include M ON-line laser outputs and L OFF-line laser outputs. The M ON-line lasers may include a first ON-line laser, a second ON-line laser, a third ON-laser, etc., and a $M^{th}$ ON-line laser. The M ON-line lasers are locked onto M different wavelengths by a first ON-line laser line lock, a second ON-line laser line lock, a third ON-line laser line lock, etc., and a $M^{th}$ ON-line laser line lock, respectively.

System 200 may also include L OFF-line lasers. For example, system 200 may include a first OFF-line laser, a second OFF-line laser, etc., and a $L^{th}$ OFF-line laser. Each of the L OFF-line lasers are locked onto L different wavelengths by a first OFF-line laser line lock, a second OFF-line laser line lock, etc., and a $L^{th}$ OFF-line laser line lock, respectively. The combination of M ON-line lasers and L OFF-line lasers add up to a total of N line lasers, which are incorporated into system 200.

A more detailed description of a multi-line tunable laser system may be found in application Ser. No. 11/135,768, filed on May 24, 2005, by the present inventor, Hooshmand M. Kalayeh, which is incorporated herein by reference in its entirety.

Figure 3:
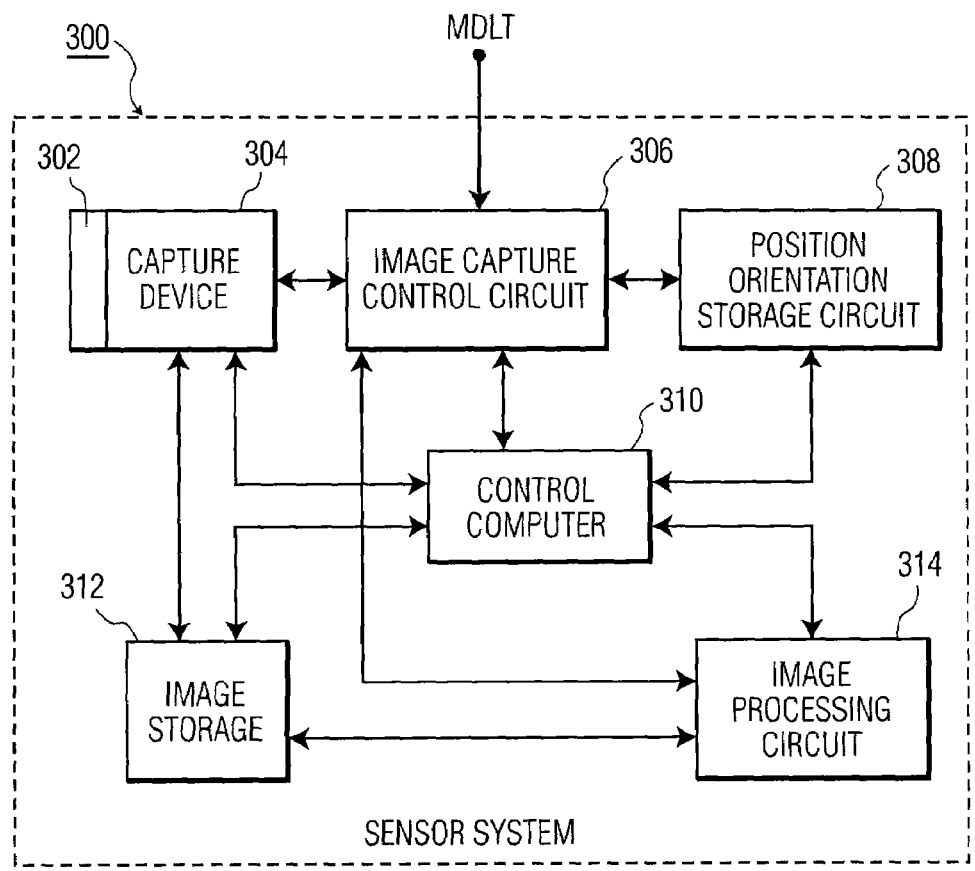
FIG. 3 is a multi-spectral camera sensor, used in an embodiment of the present invention.

Referring next to FIG. 3, multi-spectral camera sensor 108 (FIG. 1) is exemplified, in more detail, as sensor system 300. Sensor system 300 may be employed to capture images, after commanded to turn ON by DACC 102 (FIG. 1). Sensor system 300 may obtain images of the search area, or only the region of interest, on the ground level containing structures, such as roadways, pipelines, electrical power lines, and the like. Sequential images may be captured in digital form and, either stored in an aerial platform, such as an aircraft, or stored in a ground based platform by transmitting through a radial link to a control ground station.

As shown, capture device 304 may include an electronic sensor, typically a CCD or a CMOS imaging array that, along with imaging optics 302, may capture an image of target 114 (FIG. 1) in an electronic form. Imaging optics 302 may include a special optical filter attached to the input of the CCD or CMOS detector for filtering various light wavelengths before image storage.

System 300 includes image capture control circuit 306 that sequences the steps of the operation of capture device 304. The image capture control circuit 306 controls capture device 304, while obtaining position and orientation information from position and orientation storage circuit 308. Position information in the form of spatial coordinates may be provided in order to identify the location of the target of interest. Such position information as spatial coordinates may also be stored in position orientation storage circuit 308.

The operation of the various elements shown in FIG. 3 are under the control of computer 310. Control computer 310 may cause image data to be stored in image storage device 312. Control computer 312 may also identify features of a target by using image processing circuit 314. The processing sequence may also be directed by control computer 310.

It will be appreciated that many of the elements shown in FIG. 3, for example, control computer 310, image storage 312, or position orientation storage circuit 308 may be embodied in software or firmware within sensor 300, or may be partially or completely embodied within DACC 102 (shown in FIG. 1) and the remaining portion embodied within sensor system 300.

The various images stored in memory 312 may be ortho-rectified, that is, the images may be compensated for variations in position and angle at the time the images are recorded. This process may be performed in order to allow an exact pixel-by-pixel comparison of the various elements of a target scene or image.

In an embodiment of the present invention, sensor 300 is triggered to turn ON by a control or trigger signal, designated as multi-line DIAL laser trigger (MDLT). This trigger signal will be described later with reference to FIG. 4.

Figure 4:
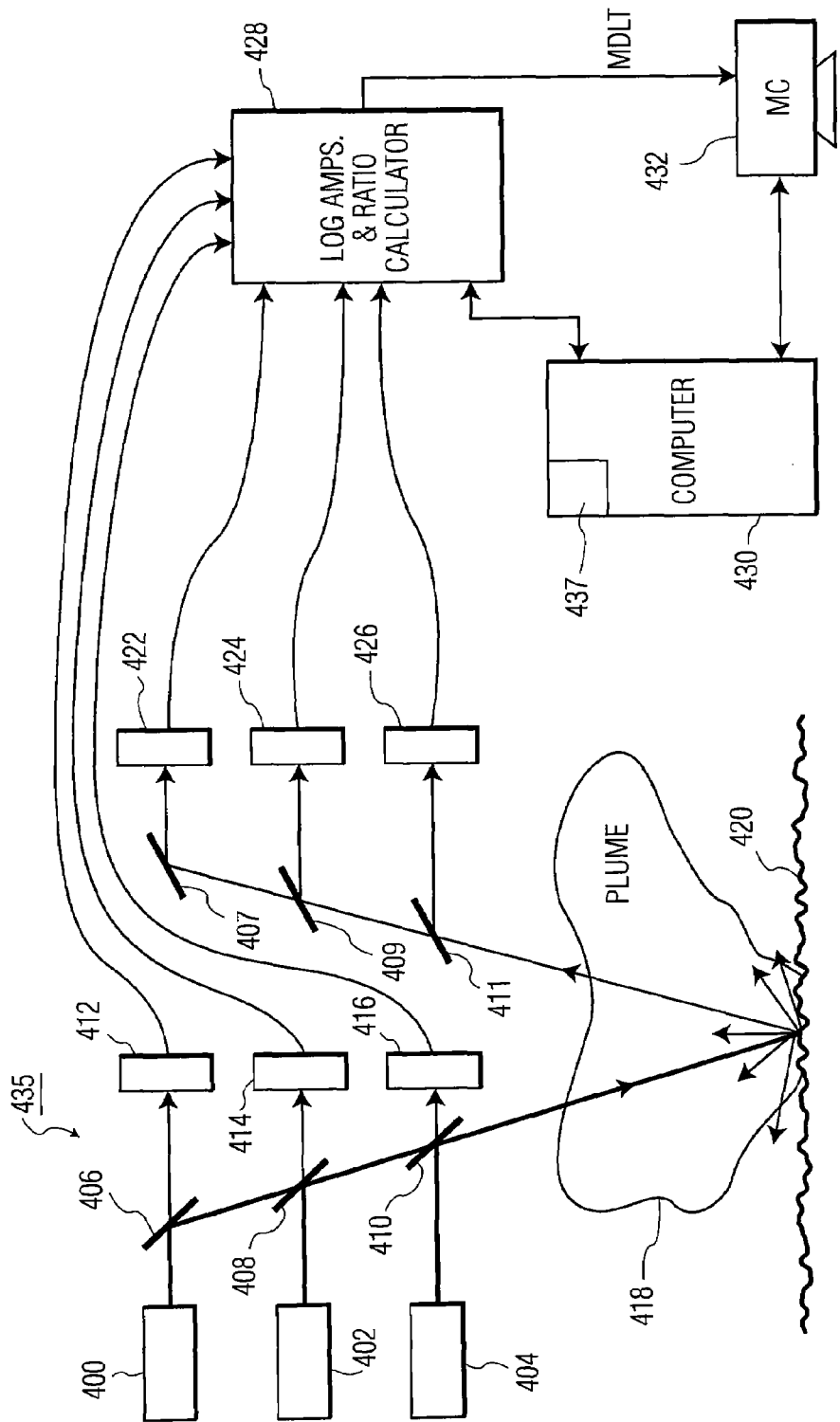
FIG. 4 depicts a DIAL sensor and a multi-spectral camera used to locate, identify and confirm a target of interest, in accordance with an embodiment of the present invention.

Referring now to FIG. 4, there is shown an exemplary embodiment of system 100, in which DIAL sensor 106 and multi-spectral camera 108 are used to locate, identify and confirm a target of interest. As shown in FIG. 4, a three-line DIAL pulsed laser system, designated as 435, is integrated with multi-spectral camera 432. This exemplary system includes three pulsed laser sources 400, 402 and 404. This exemplary system may include one or more ON-line pulsed laser sources and one or more OFF-line pulsed laser sources.

The transmitted pulse energy from laser source 400 may desirably be determined from a small portion of each pulse directed to optical sensor 412. This optical sensor forms part of an array of optical sensors that also includes optical sensors 414 and 416, which may be used to detect the transmitted pulsed energy from laser sources 402 and 404. The small portion of the laser pulsed energy detected by optical sensor 412 may be separated using beam splitter 406, as shown in FIG. 4.

As with laser source 400, the transmitted pulsed energies of laser sources 402 and 404 may desirably be determined from a small portion of each pulse directed to optical sensors 414 and 416, respectively. The small portion of the laser energy from laser source 402 may be separated using first dichroic beam splitter 408, which desirably transmits substantially all light with a wavelength provided from laser source 400. Similarly, the small portion of the laser energy from laser source 404 may be separated using second dichroic beam splitter 410, which desirably reflects substantially most of the light with a wavelength provided from laser source 404, and transmits substantially all light with wavelengths provided from laser sources 400 and 402.

Thus, beam splitters 406, 408 and 410 act to separate portions of each beam from laser sources 400, 402 and 404 for monitoring by the array of optical sensors 412, 414 and 416, respectively. The array of optical sensors 412, 414 and 416 are coupled to module 428 to provide signals proportional to the transmitted pulse energies from the 3-laser sources. Module 428 includes log amplifiers and ratio calculators for computing the concentration path lengths (CPLs) of the targets of interest.

The 3-laser beams, which are of different wavelengths, are transmitted to the target or targets of interest. In the exemplary embodiment, the target of interest is plume 418 disposed above ground 420. As shown in FIG. 4, a second set of optics, namely mirrors 407, 409 and 411 collect, separate by peak wavelength and direct the reflected portions of the 3-laser beams, reflected and/or diffracted from ground 420 and plume 418, toward a second array of optical sensors 422, 424 and 426. The second array of optical sensors direct the returned portions of the 3-laser beams toward module 428.

It will be appreciated that module 428 may calculate the log of each transmitted energy and the log of each returned reflected energy. The returned reflected energy at the peak of each wavelength may be normalized against a corresponding peak of each transmitted wavelength. In this manner, the ratio of the log normalized OFF-line energy and the log normalized ON-line energy may be calculated.

In accordance with an embodiment of the present invention, after module 428, in combination with computer 430, determine that plume 418 is present as the target of interest, then module 428 provides a trigger signal, MDLT, to multi-spectral camera 432. After multi-spectral camera 432 receives the MDLT trigger, the camera is turned ON to begin imaging plume 418. The trigger signal may be provided during a second flight pass over plume 418, upon arriving at a geographic position stored in a LUT residing in memory 437. Computer 430 may then confirm the presence of plume 418, based on images provided by multi-spectral camera 432.

In another embodiment of the present invention, the trigger signal, MDLT, which may be initiated by the multi-line DIAL sensor, is sent directly to computer 430. The computer may then obtain the geographic location(s) of the target(s) from a navigation system (not shown). The geographic location(s) of the target(s) may then individually be stored in memory 437. During a next flight pass, at or about the ROI, or at/about the target(s), a trigger may be provided from computer 430 to activate the next sensor, such as MC 432. Accordingly, computer 430 provides the trigger to turn ON a respective sensor, at an appropriate time, based on geographic location(s) of target(s) stored in the LUT.

Another embodiment of the present invention will now be described by reference to FIG. 5. As shown, multi-sensor target detection system 500 includes a data acquisition controller and coordinator, generally designated as 502, computer 510 and multiple sensors 516, 520, 524, etc., and 528. The data acquisition controller and coordinator 502 and computer 510 communicate with the multiple sensors, by way of data bus 514.

Figure 5:
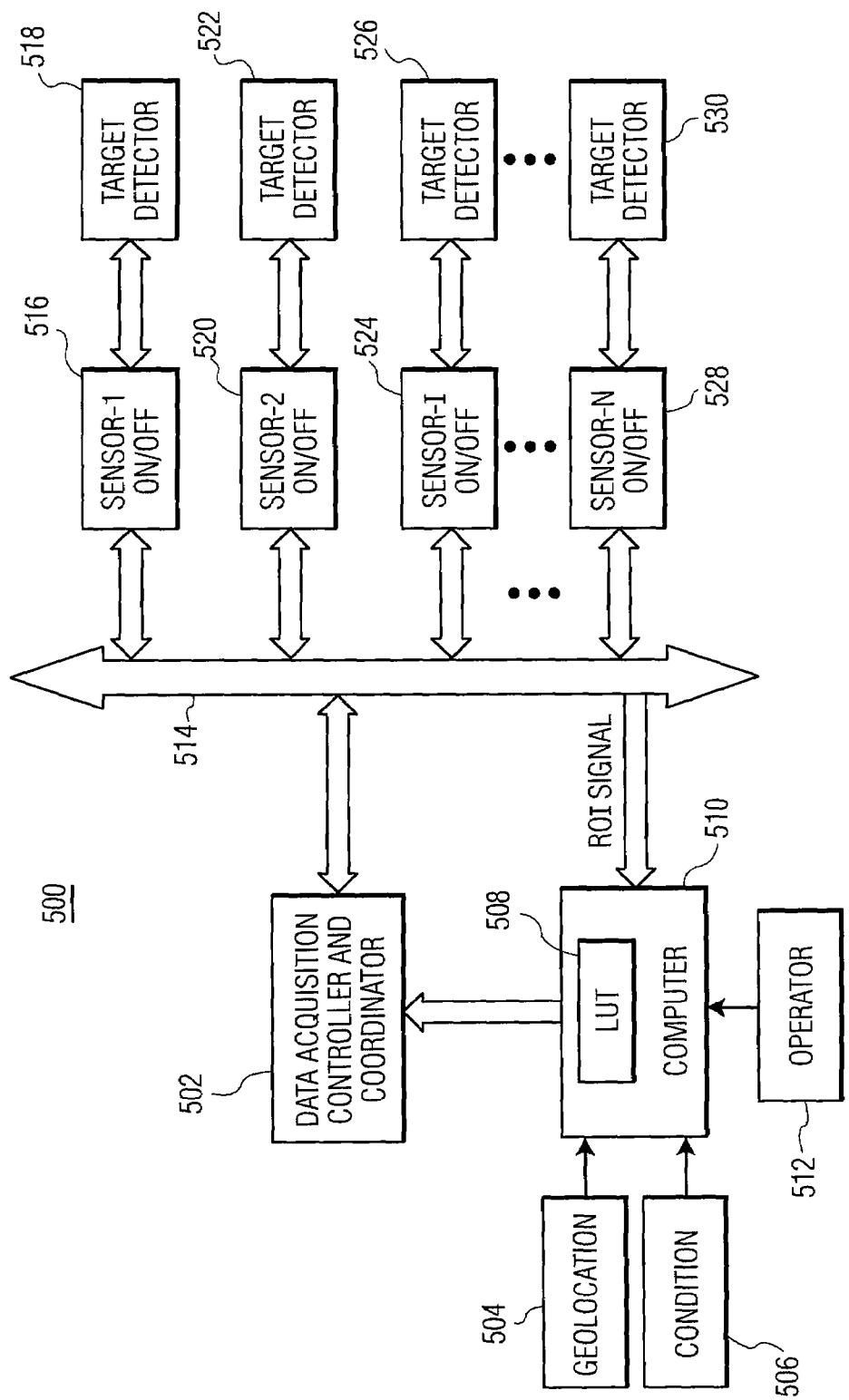
FIG. 5 shows a multi-sensor target detection system which is controlled by a data acquisition controller and coordinator and a general purpose computer, in accordance with an embodiment of the present invention.

Further shown in FIG. 5, a plurality of target detectors, generally designated as 518, 522, 526, etc., and 530, each communicates with its corresponding sensor. It will be appreciated that although target detectors 518-530 are shown as separate modules from multiple sensors 516-528, each target detector and its corresponding sensor may be integrated into a single unit or module.

Computer 510 includes a look-up table (LUT) residing in memory 508. Computer 510 also includes input data from geolocation module 504 and condition module 506. The geolocation module provides position data, such as latitude and longitude, and/or relative position data and orientation data to computer 510. When a region of interest (ROI) signal is sent from one or more sensors 516-528, computer 510 may be configured to store in the LUT the geographic or relative location of the detected ROI.

Computer 510 may be further configured to store multiple geographic coordinates of a flight pass over a search area, such as search area 112, shown in FIG. 1. Moreover, condition module 506 may provide environmental conditions associated with search area 112. Such conditions may include weather expected at the search area, terrain expected at the search area, and an identification of expected targets of interest. These environmental conditions may also be stored in LUT 508 and be associated with the position locations stored in the LUT.

Input data may be provided to computer 510, by way of a keyboard or mouse, operated by user 512.

In operation, as the aircraft passes over a search area, data acquisition controller and coordinator 502 commands sensor 1, for example, to be turned ON, while maintaining the remaining sensors in an OFF state. During a first flight pass over the search area, sensor 516 acquires data, and sends the acquired data to target detector 518. Upon detecting a target of interest, sensor 516 provides the ROI signal, by way of data bus 514, to computer 510. The location of the detected target of interest may also be stored in LUT 508, as determined by geolocation module 504.

During a second flight pass over the target of interest, as geographically determined by geolocation module 504, computer 510, in combination with data acquisition controller and coordinator 502, may command an additional sensor or more than one sensor to be turned ON. The newly turned ON sensor, or sensors, begin acquiring data on or near the target of interest. The target detector, corresponding to the newly turned-ON sensor, may also confirm the presence of the target of interest by sending its ROI signal to computer 510. Arrival of the ROI signal may trigger computer 510 to store, in the LUT, the position coordinates of the aircraft at the time of arrival of the ROI signal.

If further confirmation is necessary, a third flight pass may be performed over the target of interest. Under such circumstance, system 500 may cause still another sensor to be turned ON. Target detection by the newly turned-ON sensor would then better confirm the presence of the target of interest.

It will be understood that the present invention optimally controls the ON and OFF states of each sensor in system 500. A sensor (or more than one sensor) is turned ON based on the target of interest expected to be found at a search area and based on the environmental conditions expected to be found at the search area. Once a target of interest is detected by a first sensor (or more than one sensor), the position of that detected target of interest is stored in the LUT. During a second flight pass over the target of interest, a second sensor and/or a third sensor may be turned ON for further confirmation of the presence of the target of interest.

In this manner, the present invention advantageously minimizes data acquisition requirements and minimizes data storage requirements. The present invention also reduces the complexity and costs associated with acquisition and storage of enormous amounts of information. In operation, when using conventional systems, enormous amounts of data are acquired and stored. Much of this data, typically 95% or more, is simply discarded.

It will be further appreciated that computer 510 may be connected to a flight control system in addition to a navigation system. The navigation system may be used to obtain location data with respect to flight routes, or passes, flown by the aircraft. In addition, computer 510 may obtain aircraft steering data, such as altitude, attitude, heading, etc., in order to associate sensor target detection with aircraft flight parameters. Furthermore, computer 510 may be configured to modify target capture parameters of the multiple sensors, shown in FIG. 5, or may be configured to command, directly or indirectly, by way of data acquisition controller and coordinator 502, modifications in flight parameters, in order to satisfy target recognition accuracies. Such modifications include lower altitude flights, changes in sensor parameters, changes in flight routes, changes in angle of the sun with respect to the sensors, in order to increase the quality of the target being collected.

In each case, the method and apparatus of the present invention may stand-alone or may be a component of a larger system solution. Furthermore, human interface may be on the same aircraft, or at different physical locations. When at different locations, various communication techniques may be provided between the different locations and the aircraft. Where consistent with the foregoing disclosure of the present invention, the method of the invention may be fully automatic, may have user input (may be fully or partially manual), and may have user review to accept or reject the result.

The term "sensor" is used herein in a broad sense and includes any type of sensor, such as any type of camera and other kinds of image capture devices. Sensors are generally discussed herein in relation to capture of one or more bands of electromagnetic radiation, but may use other imaging modalities, for example, particle beam modulation or spatially localized spectroscopy. The term sensor is also inclusive of multi-spectral imagers and groups or arrays of the same or different image capture devices. A sensor may capture information in a series of two or three dimensional arrays. The sensor may include both active and passive cameras. A LIDAR imaging system is an example of an active camera, and a pangramatic camera, which takes pictures in the visible portion of the spectrum, is an example of a passive camera.

The term "aircraft" is also used in a broad sense and may include any means for moving the sensors through a set of locations relative to a target region of interest. The term aircraft is inclusive of spacecraft, and vehicles of all types including ground vehicles, having human operators, robots, or other mechanical control systems. These vehicles may be manned or unmanned, and remotely controlled or autonomous.

The term "flight pass" is used to denote a route which refers to a set of fields of view defined by proposed or actual target capture events. Each field of view corresponds to an angle a view of a respective sensor, during a respective capture event. Fields of view that are sequential in time may be spaced apart or may overlap or may be continuous with each other. A route (or flight pass) may define times for separate capture events, for example, exposure times for a sequence of visual light images. A route may or may not define movement of a sensor between capture events. For example, a military unmanned aerial vehicle (UAV) may engage in evasive maneuvers between capture events. Similarly, a route may define a set of fields of view, without defining a sequence. In such case, capture events may take place when the sensor is appropriately positioned and turned ON. For example, an aircraft may maneuver over a region of interest and may collect spectral data and image data, whenever appropriate geographic positions are reached, as determined by computer 510 and/or stored in LUT 508 in memory.

The term "region of interest" is a part of a larger body about which image or target information is desired. The region of interest may be an area, such as a portion of the surface of the earth, or a plume volume disposed above the earth. The region of interest has or may have spatially variant characteristics that may be sensed by an appropriate sensor that is turned ON in multi-sensor system 500.

The selected region may be defined by the limits of travel of the aircraft. The selected region may take into account the practice to maintain a reserve or margin on the travel of vehicles, mechanisms and the like, so as to account for measurement inaccuracies and unforeseen needs. The present invention is particularly advantageous where a larger body, or search area, includes many possible regions of interest within the limits of travel of a sensing system. These regions may be exclusive or non-exclusive. The manner of selection of a region of interest may be by human judgment, or by suitable programming of an autonomous or semi-autonomous system. For example, a remotely piloted vehicle may be tasked to fly to a particular region of interest, based upon earlier collected satellite imagery. On the other hand, an aircraft may be tasked to fly over a longer search area with the anticipation of locating one or more targets of interest.

The planned route, or flight pass, may also be determined by direct human judgment or suitable programming, taking into account the constraints imposed by the sensor and the demands of the data collection. For example, collection conditions constraining a plotted route, or flight pass, for an aircraft may include: an allowable altitude for the collection; weather; topographic features, such as hills, valleys, or tall buildings which may occlude the line of sight; and the presence of enemy installations, such as anti-aircraft installations within the search area. Sensor constraints may include sharpness, sensitivity, dynamic range, spatial and spectral resolution, and system noise. These factors are unlikely to be uniform within a given data collection zone, or in different locations within a single image.

Target detection and recognition requirements applicable to a region of interest may likewise be a human judgment, based upon requirements of a particular user, and may be set by the user or by suitable programming techniques. The target detection and recognition may include a single image quality metric defining a value or range of values that are applicable to the region of interest. Alternatively, a plurality of subregions of the region of interest may also be defined in the same manner as the region of interest. In such case, the target detection and recognition requirement may be a plurality of quality metrics matched to respective subregions. Depending on the degree of target identification and recognition that is required by the user, one or more flight passes may be flown over a detected target of interest, in order to provide the level of detection and recognition required by the user.

As an example of usage of multi-sensor system 500, it is assumed that flight planning support requires an aircraft to identify an oil spill (a target of interest) along a search area. The route for the search area may be stored in LUT 508. The present invention turns ON an appropriate sensor, for example, a multi-line DIAL system for data acquisition and target detection of an oil leak, along the flight pass or route in the search area. No other sensor is turned ON. This condition effectively prevents voluminous data collection, because the other sensors are in an OFF state and only one sensor is in an ON state.

As system 500 is acquiring data using the multi-line DIAL sensor, target of interest 114, for example, may be detected. Upon detection of target 114, a trigger signal, such as an ROI signal, is sent to computer 510. Computer 510 then stores the geographic location of the target of interest in LUT 508. A possible oil or gas leak has now been detected.

Depending on the recognition accuracy requirements of the user, another flight pass may or may not be performed over the target of interest. Assuming that an additional flight pass is required, computer 510, commands a second sensor to be turned ON. Such additional sensor may be the multi-spectral camera shown triggered in FIG. 4. The multi-spectral camera is then appropriately turned ON, based on the aircraft arriving near or about the target of interest. After turn ON, the multi-spectral camera begins imaging the target of interest and begins to accumulate target data, in order to more accurately confirm the presence of the oil or gas leak. At this time, during the second flight pass, two sensors are in an ON state and the other sensors are in an OFF state. Both sensors may now more accurately determine whether an oil or gas leak is present at the target of interest.

Accordingly, the present invention advantageously minimizes the number of sensors that are concurrently turned ON to acquire and collect data. A sensor may or may not be turned ON, depending upon a preceding occurrence of an event, such as target detection by another sensor that has previously been turned ON to acquire and collect data. Thus, the sensor is turned ON, as a result of being triggered to turn ON by the target detection of a previously turned ON sensor. The time for the turn ON command may be delayed, until the appropriate time arrives when the aircraft is near or about the target detected by the previous sensor. In this manner, the present invention minimizes the amount of data that is required to be collected and stored.

The present invention, thus, provides increased efficiency for mission planning, data collection and utilization of remote sensed data. The present invention allows for better mission tasking, such that data is likely to be collected at the required time and at the required recognition accuracy level, without expensive over tasking of the system or undo risk of collecting data which may or may not meet a user's requirement. The present invention, furthermore, eliminates the need for some of the sensors in system 500 from having to be turned ON to collect data.

Figure 6:
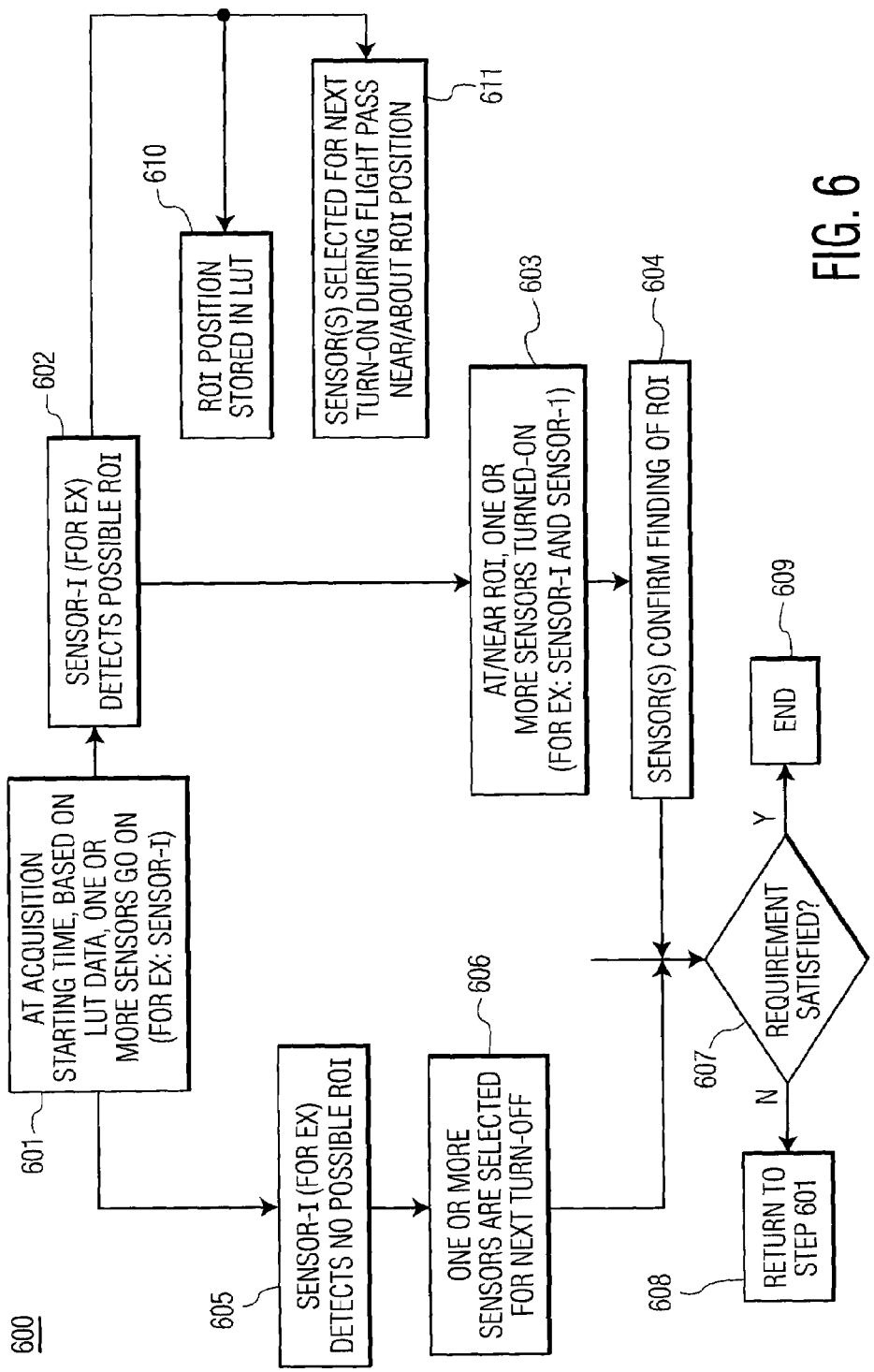
FIG. 6 is a flow diagram of an exemplary method of the present invention when using the multi-sensor system of FIG. 1.

Referring now to FIG. 6, method 600 will now be described by reference to the system shown in FIG. 5. Entering step 601, the method of the invention turns ON one or more sensors. As an example, sensor-I of FIG. 5 may be turned ON. In step 602, if sensor-I (for example) detects a possible ROI, the method enters steps 610 and 611. In step 610, computer 510 is configured to update LUT 508 by storing the geographic position of the possible ROI detected by sensor-I. In step 611, computer 510 selects which sensor(s) to turn ON for the next flight pass and determines the time to turn ON these selected sensors. Such decisions may be based on the type of ROI stored in LUT 508, its location and environment. In the exemplary embodiment, such sensor(s), for example, may be sensor-1 and sensor-I. Both are to be turned ON at/near the possible ROI.

The method enters step 603 and turns ON sensor-1 and sensor-I (for example), when the ROI's geographic position is approached by the aircraft. At this phase of the flight, both sensors-I and sensor-1 are turned ON. The remaining sensors in system 500 are turned OFF.

At step 604, sensor-I may again detect the same ROI. Furthermore, now sensor-1 may also detect the same ROI, thereby confirming the detection by sensor-I.

Decision box 607 is entered next. The method determines whether the user's requirement of a predetermined confidence level is met by the confirmation of the ROI with only two sensors (I and 1). If the requirement is satisfied, the method branches to step 609 and the process ends. If the requirement is not satisfied, the method branches to step 608 and returns to step 601 for additional confirmation.

Returning to step 601, the method turns ON one or more sensors (for example sensor-I). If no possible ROI is detected in step 605, then the method enters step 606. In the absence of an ROI signal from sensor-I, the method commands all sensors currently in an ON state to switch into an OFF state. Following such command, all the sensors of system 500 are turned OFF.

If user requirement is satisfied, any further flight over the search area is terminated. If user requirement, however, is not satisfied, then another flight pass over search area 112 may be performed to again attempt to find a target of interest. Method 600 may continue the process by systematically turning ON and/or OFF other sensors, in sequence, based on data stored in the LUT and based on the end user's requirements.

It will be understood that the method of the invention may detect and confirm more than one ROI during a flight pass. For example, multiple possible ROIs may be detected by a multi-sensor DIAL system (for example) during one flight pass. These multiple ROI's may then be stored in the LUT, along with the locations of these ROIs. During a second flight pass, the system may be commanded to turn ON both the multi-sensor DIAL system and a multi-spectral camera (for example), at the appropriate time, at/near the location of each possible ROI. Now both the multi-sensor DIAL system and the multi-spectral camera may confirm the presence of each of the stored ROIs. In this manner, the amount of data that needs to be collected is advantageously minimized by the present invention.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A method of acquiring data using multiple sensors integrated in one or more vehicles, the method comprising the steps of:
    (a) turning ON a DIAL sensor to detect one or more targets of interest, during a first pass over a preplanned path, wherein the targets include gas or oil pipeline leaks located at regions of interest (ROI);
    (b) storing locations of the detected targets of the ROI in a computer Look Up Table (LUT);
    (c) during a second pass over the ROI, triggering another sensor to turn ON at or about the location stored in the LUT; and
    (d) confirming presence of the detected targets using both the other sensor and the DIAL sensor;
    (e) quantifying the detected targets using data acquired during the first and second pass;
    (f) mapping quantities and associated locations of the detected targets of the ROI;
    (g) storing the quantities and associated locations of the detected targets of the ROI in a computer as a map image; and
    (h) displaying the map image;
        wherein the other sensor is a multi-spectral camera which is turned ON by a trigger from the DIAL sensor.

2. The method of claim 1 wherein
the DIAL sensor is a multi-line DIAL sensor having at least two ON-line laser light sources and one OFF-line laser light source for simultaneous illumination of the target.

3. The method of claim 1 wherein
after turning ON the DIAL sensor, acquiring data using the DIAL sensor during the first and second pass over the ROI, and
after triggering the other sensor to turn ON, acquiring data using the other sensor only during the second pass and only at or about the location stored in the LUT.

4. The method of claim 1 including the steps of:
determining whether the confirmation of a target, using the other sensor, satisfies an end user's requirement of accuracy;
if not satisfied, storing another location of the target detected by the other sensor in the LUT;
during a third pass over the ROI, triggering still another sensor to turn ON at or about the other location stored in the LUT; and
confirming presence of the target of interest using three sensors, the DIAL sensor and both other sensors.

5. The method of claim 4 wherein
the DIAL sensor is a multi-line DIAL sensor having at least two ON-line laser light sources and one OFF-line laser light source for simultaneous illumination of the target,
the other sensor is a multi-spectral camera which is turned ON by a trigger from the multi-line DIAL sensor, and
the still other sensor is triggered to turn ON by either the multi-line DIAL sensor or the multi-spectral camera.

6. The method of claim 5 wherein
after turning ON the DIAL sensor, acquiring data using the DIAL sensor during the first, second and third passes over the ROI,
after triggering the other sensor to turn ON, acquiring data using the other sensor only during the second and third passes and only at or about the location stored in the LUT, and
after triggering the still other sensor to turn ON, acquiring data using the still other sensor only during the third pass and only at or about the new location stored in the LUT.

7. A method of acquiring data using multiple sensors in an aircraft, the method comprising the steps of:
(a) turning ON a multi-spectral camera to detect a target of interest during a first flight pass over a region of interest (ROI), wherein the target of interest is a gas or oil pipeline leak;
(b) detecting the target of interest using the multi-spectral camera;
(c) storing location of the detected target in a look up table (LUT);
(d) during a second flight pass over the ROI, triggering another sensor to turn ON at or about the location stored in the LUT;
(e) confirming presence of the target of interest using both the other sensor and the multi-spectral camera;
(f) determining whether the confirmation of the target of interest, using the other sensor, satisfies an end user's requirement of accuracy;
(g) if not satisfied, storing another location of the target of interest detected by the other sensor in the LUT;
(h) during a third flight pass over the ROI, triggering still another sensor to turn ON at or about the other location stored in the LUT; and
(i) confirming presence of the target of interest using the still other sensor.

8. The method of claim 7 wherein
the other sensor is a multi-line DIAL sensor having at least two ON-line laser light sources and one OFF-line laser light source for simultaneous illumination of the target.

9. The method of claim 8 wherein
the multi-spectral camera triggers the multi-line DIAL sensor to turn ON.

10. The method of claim 8 wherein
after turning ON the multi-spectral camera, acquiring data using the multi-spectral camera during the first and second flight pass over the ROI, and
after triggering the other sensor to turn ON, acquiring data using the other sensor only during the second flight pass and only at or about the location stored in the LUT.

11. The method of claim 7 wherein
the other sensor is a multi-line DIAL sensor having at least two ON-line laser light sources and one OFF-line laser light source for simultaneous illumination of the target,
the multi-spectral camera triggers the multi-line DIAL sensor to turn ON, and
the still other sensor is triggered to turn ON by either the multi-line DIAL sensor or the multi-spectral camera.

12. The method of claim 11 wherein
after turning ON the multi-spectral camera, acquiring data using the multi-spectral camera during the first, second and third flight passes over the ROI,
after triggering the multi-line DIAL sensor to turn ON, acquiring data using the multi-line DIAL sensor only during the second and third flight passes and only at or about the location stored in the LUT, and
after triggering the still other sensor to turn ON, acquiring data using the still other sensor only during the third flight pass and only at or about the new location stored in the LUT.

13. A method of acquiring data using multiple sensors in an aircraft, the method comprising the steps of:
(a) turning ON a first sensor to detect a target of interest during a first flight pass over a region of interest (ROI);
(b) detecting the target of interest using the first sensor;
(c) storing location of the detected target in a look up table (LUT);
(d) during a second flight pass over the ROI, triggering a second sensor to turn ON at or about the location stored in the LUT; and
(e) confirming presence of the target of interest using the both the first and second sensors.

14. The method of claim 13 wherein
the first sensor is a DIAL sensor having at least one ON-line laser light source and one OFF-line laser light source for simultaneous illumination of the target.

15. The method of claim 14 wherein
the second sensor is a multi-spectral camera which is turned ON by a trigger from the DIAL sensor.

16. The method of claim 14 wherein
after turning ON the DIAL sensor, acquiring data using the DIAL sensor during the first and second flight pass over the ROI, and
after triggering the second sensor to turn ON, acquiring data using the second sensor only during the second flight pass and only at or about the location stored in the LUT.

17. The method of claim 13 including the steps of:
determining whether the confirmation of the target of interest, using the second sensor, satisfies an end user's requirement of accuracy;
if not satisfied, storing another location of the target of interest detected by the second sensor in the LUT;
during a third flight pass over the ROI, triggering a third sensor to turn ON at or about the other location stored in the LUT; and
confirming presence of the target of interest using three sensors, the first, second and third sensors.

18. The method of claim 17 wherein
the first sensor is a DIAL sensor tuned to a first set of wavelengths,
the second sensor is a multi-spectral camera, and
the third sensor is one of a synthetic aperture radar (SAR) sensor, a LIDAR sensor, or a DIAL sensor tuned to another set of wavelengths.

* * * * *